US012565049B2

(12) United States Patent
Durham

(10) Patent No.: US 12,565,049 B2
(45) Date of Patent: Mar. 3, 2026

(54) SINGLE PASS PRINTING FOR SPHERICAL BALLS

(71) Applicant: Taylor Made Golf Company, Inc., Carlsbad, CA (US)

(72) Inventor: Tim Durham, Cleveland, SC (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 141 days.

(21) Appl. No.: 18/360,475

(22) Filed: Jul. 27, 2023

(65) Prior Publication Data

US 2024/0034057 A1 Feb. 1, 2024

Related U.S. Application Data

(60) Provisional application No. 63/369,535, filed on Jul. 27, 2022.

(51) Int. Cl.

| | |
|---|---|
| ***B41J 3/407*** | (2006.01) |
| ***A63B 45/02*** | (2006.01) |
| ***B41J 2/045*** | (2006.01) |
| ***B41J 2/21*** | (2006.01) |

(52) U.S. Cl.

CPC ......... *B41J 3/4073* (2013.01); *B41J 2/04573* (2013.01); *B41J 2/2146* (2013.01); *A63B 45/02* (2013.01)

(58) Field of Classification Search

CPC ...................................................... B41J 3/4073

See application file for complete search history.

(56) References Cited

U.S. PATENT DOCUMENTS

| | | | | |
|---|---|---|---|---|
| 5,043,740 | A * | 8/1991 | Kneezel | B41J 2/04505 347/12 |
| 5,778,793 | A | 7/1998 | Mello et al. | |
| 6,538,767 | B1 * | 3/2003 | Over | B41J 3/4073 358/1.18 |
| 6,551,195 | B2 | 4/2003 | Byrne et al. | |
| 7,611,216 | B2 * | 11/2009 | Sussmeier | B41J 2/0458 347/14 |
| 8,617,004 | B2 | 12/2013 | Morgan et al. | |

(Continued)

FOREIGN PATENT DOCUMENTS

| | | | | |
|---|---|---|---|---|
| DE | 102023108916 | A1 * | 10/2024 | |
| JP | 2010152879 | A * | 7/2010 | B33Y 50/00 |
| JP | 2014100880 | A * | 6/2014 | B41J 2/01 |

OTHER PUBLICATIONS

Machine generated English translation of JP2010152879A to Seki et al., "Device, Method and Program for Deforming Image Shape," retrieved via worldwide.espacenet.com on May 7, 2025; 13pp.*

(Continued)

*Primary Examiner* — Shelby L Fidler

(74) *Attorney, Agent, or Firm* — Sterne, Kessler, Goldstein & Fox P.L.L.C.

(57) ABSTRACT

Single pass printing methods designed to reduce or prevent unwanted image distortion and/or image defects when printing on a ball. In some embodiments, the methods can tailor one or more of nozzle firing time, nozzle firing frequency, or ink volume to reduce or prevent unwanted image distortion and/or image defects. Some embodiments are directed to golf balls comprising one or more images printed according to a single pass printing method described herein.

21 Claims, 11 Drawing Sheets

(56) References Cited

U.S. PATENT DOCUMENTS

| | | | |
|---|---|---|---|
| 8,727,913 B2 | 5/2014 | Morgan | |
| 8,758,168 B2 | 6/2014 | Morgan et al. | |
| 8,915,802 B2 | 12/2014 | Morgan | |
| 8,915,803 B2 | 12/2014 | Hogge et al. | |
| 8,915,804 B2 | 12/2014 | Hogge et al. | |
| 8,979,678 B2 | 3/2015 | Hogge et al. | |
| 9,056,223 B2 | 6/2015 | Hogge et al. | |
| 9,056,224 B2 | 6/2015 | Morgan | |
| 9,199,127 B2 | 12/2015 | Zieske et al. | |
| 9,199,134 B2 | 12/2015 | Zieske et al. | |
| 9,238,160 B2 | 1/2016 | Zieske et al. | |
| 9,283,443 B1 | 3/2016 | Hanna et al. | |
| 9,480,880 B2 | 11/2016 | Morgan et al. | |
| 10,022,954 B1 | 7/2018 | Melanson et al. | |
| D860,344 S | 9/2019 | Brewer, III et al. | |
| D860,348 S | 9/2019 | Bartels et al. | |
| 10,532,251 B1 | 1/2020 | Madson et al. | |
| 10,611,181 B1 | 4/2020 | Moylan | |
| 11,013,961 B2 | 5/2021 | Fox et al. | |
| 11,577,127 B2 | 2/2023 | Fox et al. | |
| 2002/0032076 A1 | 3/2002 | Isogawa et al. | |
| 2002/0097280 A1* | 7/2002 | Loper | B41J 3/40731 347/2 |
| 2003/0153396 A1 | 8/2003 | Andresen | |
| 2004/0176184 A1 | 9/2004 | Morgan et al. | |
| 2005/0170920 A1 | 8/2005 | Boyer et al. | |
| 2006/0050095 A1 | 3/2006 | Kakuno et al. | |
| 2006/0148593 A1 | 7/2006 | Sato et al. | |
| 2006/0293113 A1 | 12/2006 | Pelz | |
| 2007/0207874 A1 | 9/2007 | Klein | |
| 2008/0004135 A1 | 1/2008 | Ono | |
| 2008/0020865 A1 | 1/2008 | Mitsuba | |
| 2008/0096691 A1 | 4/2008 | Kang | |
| 2009/0149278 A1 | 6/2009 | Wu et al. | |
| 2009/0209367 A1 | 8/2009 | Stefan et al. | |
| 2009/0211476 A1 | 8/2009 | Inoue et al. | |
| 2010/0323055 A1 | 12/2010 | Inoue et al. | |
| 2011/0039638 A1 | 2/2011 | Koleoglou | |
| 2011/0285800 A1 | 11/2011 | Sigismondo | |
| 2012/0071275 A1 | 3/2012 | Williams | |
| 2012/0258815 A1 | 10/2012 | Barrett | |
| 2012/0264539 A1 | 10/2012 | Hueber | |
| 2012/0297994 A1 | 11/2012 | Weiss | |
| 2013/0130841 A1 | 5/2013 | Morgan et al. | |
| 2013/0316849 A1 | 11/2013 | Zieske et al. | |
| 2013/0323427 A1 | 12/2013 | Zieske et al. | |
| 2013/0324323 A1 | 12/2013 | Yontz | |
| 2014/0018193 A1 | 1/2014 | Morgan et al. | |
| 2014/0066229 A1 | 3/2014 | Kuntimaddi | |
| 2014/0073462 A1 | 3/2014 | Morgan | |
| 2014/0106905 A1 | 4/2014 | Morgan et al. | |
| 2014/0166196 A1 | 6/2014 | Flynn | |
| 2014/0178586 A1 | 6/2014 | Strozyk | |
| 2015/0102521 A1 | 4/2015 | Nagasawa | |
| 2015/0165278 A1 | 6/2015 | Oberg | |
| 2015/0202497 A1 | 7/2015 | Lee et al. | |
| 2015/0367184 A1 | 12/2015 | Hebert et al. | |
| 2016/0158605 A1 | 6/2016 | Morgan | |
| 2020/0108297 A1 | 4/2020 | Madson et al. | |
| 2021/0228945 A1 | 7/2021 | Loper et al. | |
| 2021/0322833 A1 | 10/2021 | Fox et al. | |
| 2022/0047923 A1 | 2/2022 | Durham | |

OTHER PUBLICATIONS

Machine generated English translation of JP2014100880A to Onodera, "System of Printing on Three-Dimensional Object and Program for Printing on Three-Dimensional Object"; retrieved via worldwide.espacenet.com on May 7, 2025; 18pp.*

Machine generated English translation of DE102023108916A1 to Spellucci et al., "Method for Generating a Print Image"; retrieved via worldwide.espacenet.com on May 7, 2025; 15pp.*

* cited by examiner

SINGLE PASS PRINTING FOR SPHERICAL BALLS

CROSS-REFERENCE TO RELATED APPLICATIONS

This application claims priority to U.S. Provisional Application No. 63/369,535, filed Jul. 27, 2022, which is incorporated herein in its entirety by reference thereto.

FIELD

The present disclosure relates to single pass printing methods. In particular, the present disclosure relates to single pass printing methods for printing on spherical balls and balls with single-pass-printed images printed thereon.

BACKGROUND

Images printed on a ball, for example a golf ball, can serve various functions, including identifying a particular ball, providing an alignment feature, and/or customizing a ball to a player's liking. The clarity and aesthetics of the printed images on the golf ball can be important for a player.

Images printed on a spherical ball, for example a golf ball, can be printed using single pass printing technology, for example, single pass inkjet printing technology, where the ball passes under or adjacent to a printer head while rotating at a predetermined speed. With single pass printers, the ball can pass under or adjacent to one or more printer heads only once, producing high throughput speeds for mass production. In some cases, single pass systems are able to run at extremely high speeds, up to 50 inches per second and higher.

However, printing images using single pass technology creates a unique set of challenges for reliably, consistently, and clearly printing images. In particular, avoiding image distortion can be a challenge because the image is quickly printed on a rotating ball in a single printing pass. Unless properly accounted for, the rotation of the ball and the curvature of the ball's surface can cause undesired image distortion.

Hence, what is needed are single pass printing methods configured to reduce image distortion and/or image defects, thereby facilitating reliable, consistent, and clear single pass printing of images. Further, what is needed are methods for controlling the ejection of ink from nozzles of single pass printer heads to reduce image distortion and/or image defects.

BRIEF DESCRIPTION OF THE DRAWINGS/FIGURES

The accompanying drawings, which are incorporated herein and form a part of the specification, illustrate the present disclosure and, together with the description, further serve to explain the principals thereof and to enable a person skilled in the pertinent art to make and use the same. Aspects of the present disclosure are best understood from the following detailed description when read with the accompanying figures. It is noted that, in accordance with the standard practice in the industry, features are not drawn to scale. In fact, the dimensions of the features may be arbitrarily increased or reduced for clarity of discussion.

BRIEF SUMMARY

Figure 1:
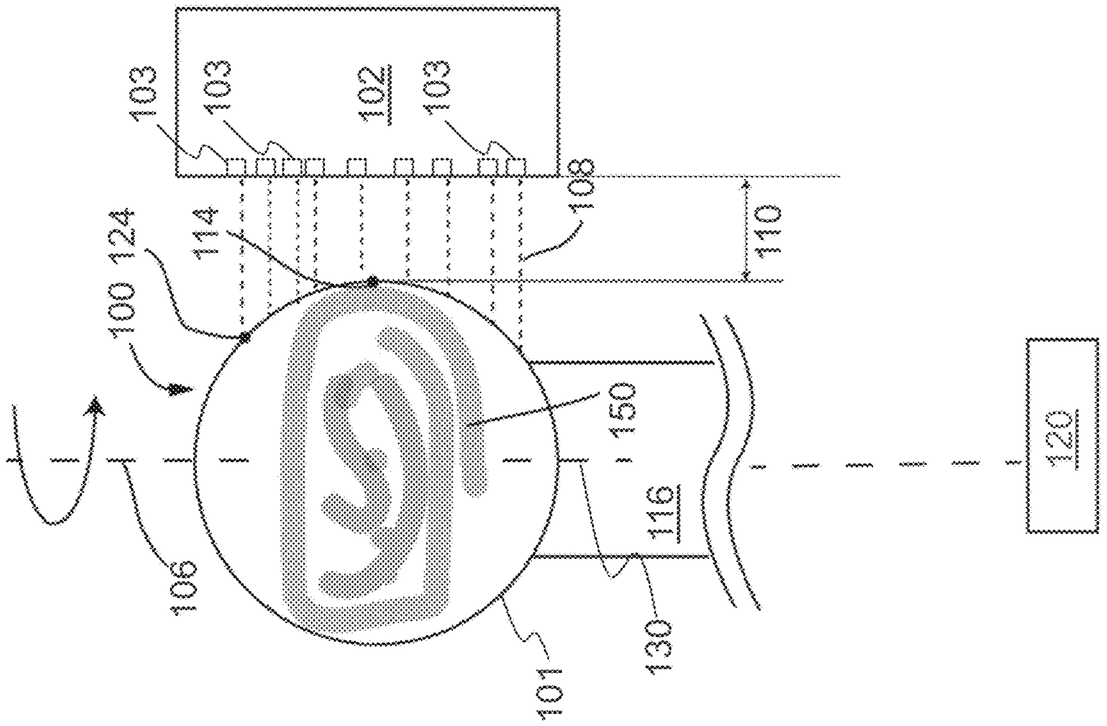
FIG. 1 illustrates a single pass printing system according to some embodiments.

The present disclosure describes single pass printing methods for printing one or more images on a ball, and balls comprising one or more images printed using the single pass printing methods described.

A first embodiment (1) of the present application is directed to a single pass printing method for a spherical ball, the method comprising: rotating the spherical ball on a first central axis of the ball; printing an image on the ball with a plurality of nozzles while the ball is rotating; where: the image on the ball is defined by an image area comprising a top boundary line and a bottom boundary line; the image area is printed by printing ink droplets correlating to pixels arranged in consecutive image lines, each image line defined by a plurality of the pixels disposed between the top boundary line and the bottom boundary line; a center location of each pixel is defined by: a positive angle θ or a negative angle −θ, and a positive linear distance Y from a second central axis of the ball perpendicular to the first central axis or a negative linear distance −Y from the second central axis, each pixel comprises one or more ink droplets printed by a respective one of the nozzles; a nozzle firing time of each of the plurality of nozzles is based on the center location of the pixel correlating to an ink droplet the nozzle prints; and θ, −θ, Y and −Y are defined by the following equations, where R is the radius of the ball measured on the second central axis:

$$\sin(\theta) = \frac{Y}{R}$$

$$\sin(-\theta) = \frac{-Y}{R}.$$

In a second embodiment (2), the nozzle firing time of each of the plurality of nozzles according to the first embodiment (1) is based on an absolute value of Y or −Y (|Y|) for the pixel correlating to an ink droplet the nozzle prints.

In a third embodiment (3), the nozzle firing time for a first nozzle printing an ink droplet correlating to a first pixel located at a higher |Y| according to the second embodiment (2) is earlier than the nozzle firing time for a second nozzle printing an ink droplet correlating to a second pixel located at a lower |Y|.

In a fourth embodiment (4), the nozzle firing time for the first nozzle according to the third embodiment (3) is about 1.6 microseconds earlier than the nozzle firing time for the second nozzle.

In a fifth embodiment (5), the nozzle firing time of each of the plurality of nozzles according to any one of embodiments (2)-(4) is proportional to the |Y| for the respective pixels in the image line.

In a sixth embodiment (6), the single pass printing method according to the fifth embodiment (5) is provided and, as |Y| decreases, the nozzle firing time increases.

In a seventh embodiment (7), the nozzle firing time of each of the plurality of nozzles according to any one of embodiments (1)-(6) is based on an absolute value of θ or −θ (|θ|) for the pixel correlating to an ink droplet the nozzle prints.

In an eighth embodiment (8), the nozzle firing time for a first nozzle printing an ink droplet correlating to a first pixel located at a higher |θ| according to the seventh embodiment (7) is earlier than the nozzle firing time for a second nozzle printing an ink droplet correlating to a second pixel located at a lower |θ|.

In a ninth embodiment (9), the nozzle firing time for the first nozzle according to the eighth embodiment (8) is about 1.6 microseconds earlier than the nozzle firing time for the second nozzle.

In a tenth embodiment (10), the nozzle firing time of each of the plurality of nozzles according to any one of embodiments (7)-(9) is proportional to |θ| for the respective pixels in the image line.

In an eleventh embodiment (11), the single pass printing method according to the tenth embodiment (10) is provided and, as |θ| decreases, the nozzle firing time increases.

In a twelfth embodiment (12), the image area according to any one of embodiments (1)-(11) comprises a continuous image band wrapped around all or portion of the ball and having a constant height.

In a thirteenth embodiment (13), the continuous image band according to the twelfth embodiment (12) is printed by printing ink droplets correlating to pixels in consecutive image lines having a different number of pixels.

In a fourteenth embodiment (14), the continuous image band according to the twelfth embodiment (12) or the thirteenth embodiment (13) wraps completely around the ball.

In a fifteenth embodiment (15), the continuous image band according to any one of embodiments (12)-(14) wraps around the ball such that a first portion of the image band overlaps a second portion of the image band.

In a sixteenth embodiment (16), the image lines correlating to the first portion of the image band and the second portion of the image band according to the fifteenth embodiment (15) are printed with a smaller volume of ink compared to the image lines correlating to the remainder of the image band.

In a seventeenth embodiment (17), the ball according to any one of embodiments (1)-(16) is rotating at a rate of about 160 revolutions per minute.

In an eighteenth embodiment (18), the plurality of nozzles according to any one of embodiments (1)-(17) print at a resolution of at least 360 dpi.

In a nineteenth embodiment (19), a volume of the ink droplets printed by the plurality of nozzles according to any one of embodiments (1)-(18) varies based on an absolute value of Y or −Y (|Y|) for the pixels correlating to the ink droplets the nozzles print.

In a twentieth embodiment (20), the dpi of ink droplets printed by the plurality of nozzles according to any one of embodiments (1)-(18) varies based on an absolute value of Y or −Y (|Y|) for the pixels correlating to the ink droplets the nozzles print.

A twenty-first embodiment (21) of the present application is directed to a golf ball, comprising a surface; and a single-pass-printed image printed on the surface, the single-pass-printed image comprising a continuous image band that wraps around the ball such that a first portion of the image band overlaps a second portion of the image band at an overlap area.

In a twenty-second embodiment (22), the golf ball according to the twenty-first embodiment (21) is provided and the first portion of the image band comprises a first ink density, the second portion of the image band comprises a second ink density, a third portion of the image band located between the first portion and the second portion comprises a third ink density, and the third ink density is greater than both first ink density and the second ink density.

In a twenty-third embodiment (23), the first ink density according to the twenty-second embodiment (22) is 40% to 60% of the third ink density, and the second ink density according to the twentieth embodiment (20) is 40% to 60% of the third ink density.

In a twenty-fourth embodiment (24), the sum of the first ink density and the second ink density according to the twenty-second embodiment (22) or the twenty-third embodiment (23) equals the third ink density.

In a twenty-fifth embodiment (25), the first portion according to any one of embodiments (22)-(24) comprises a first ink layer, and the second portion according to any one of embodiments (22)-(24) comprises a second ink layer that overlaps the first ink layer.

In a twenty-sixth embodiment (26), the third portion according to the twenty-fifth embodiment (25) comprises only one ink layer.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting.

As used herein, the term "about" refers to a value that is within ±10% of the value stated. For example, about 3 seconds can include any number between 2.7 seconds and 3.3 seconds.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

Embodiments described herein comprise single pass printing methods configured to reduce image distortion and/or image defects, thereby facilitating reliable, consistent, and clear single pass printing of images. Embodiments described herein comprise methods for controlling the ejection of ink from nozzles of single pass printer heads to reduce image distortion and/or image defects. Parameters of the ink ejection include nozzle firing time, nozzle firing frequency, the volume of ink ejected by nozzles, or a combination thereof. By controlling one or more of these parameters as described herein, images can be printed in a consistent fashion while reducing or preventing unwanted image distortion and/or image defects. Controlling one or more of these parameters can be achieved by programing the software of a single pass printing system to eject ink from nozzles as described herein.

Images printed according to methods described herein can comprise, but are not limited to logos, trademarks, technology names, alignment features (for example an alignment arrow or band), custom images, ball numbers, and other ball indicia. Similarly, spherical balls, for example golf balls, according to embodiments described herein can comprise one or more images in the form of a logo, a trademark, a technology name, an alignment features (for example an alignment arrow or band), a custom image, a ball number, and other ball indicia. While various embodiments are described herein with reference to a golf ball, other spherical balls can comprise the single pass printed images described herein. Other exemplary spherical balls include, but are not limited to, lacrosse balls, soccer balls, pool balls, table tennis balls, baseballs, basketballs, and volleyballs. In some embodiments, images printed according to methods described herein can be printed on curved, but not spherical balls, such as footballs or rugby balls.

Golf balls according to embodiments described herein can comprise one or more single-pass-printed images. In particular embodiments, the golf balls according to embodiments described herein can comprise one or more images printed according to single pass printing methods described herein. In some embodiments, a single-pass-printed image can comprise a band that warps around a portion of the golf ball. In some embodiments, the single-pass-printed image can comprise a continuous or discontinuous band that wraps around an entire circumference of the golf ball. In such embodiments, a first portion of the band may overlap a second portion of the band.

Figure 2:
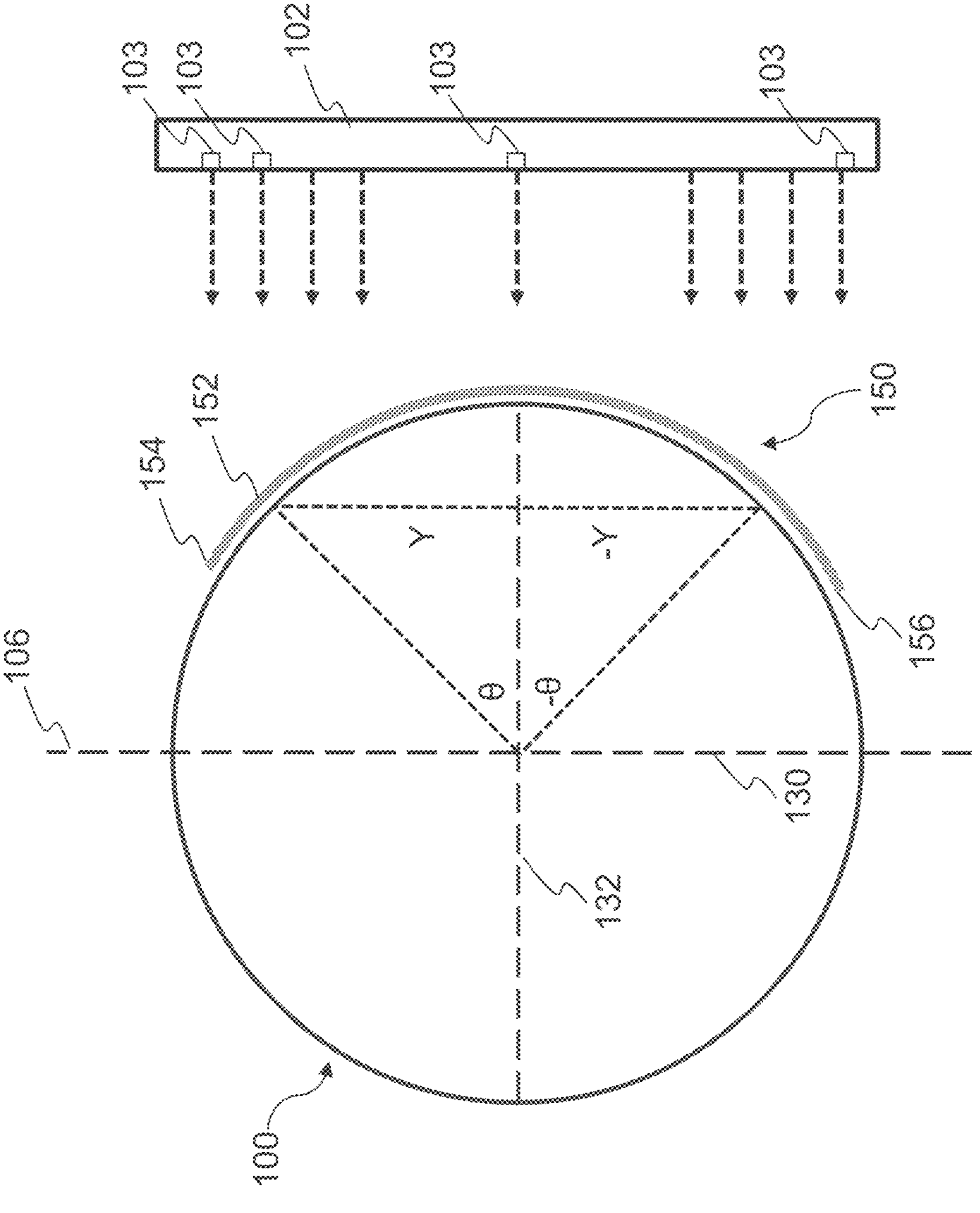
FIG. 2 illustrates a ball with a printed image located above and below a central axis of the ball according to some embodiments.
Figure 3:
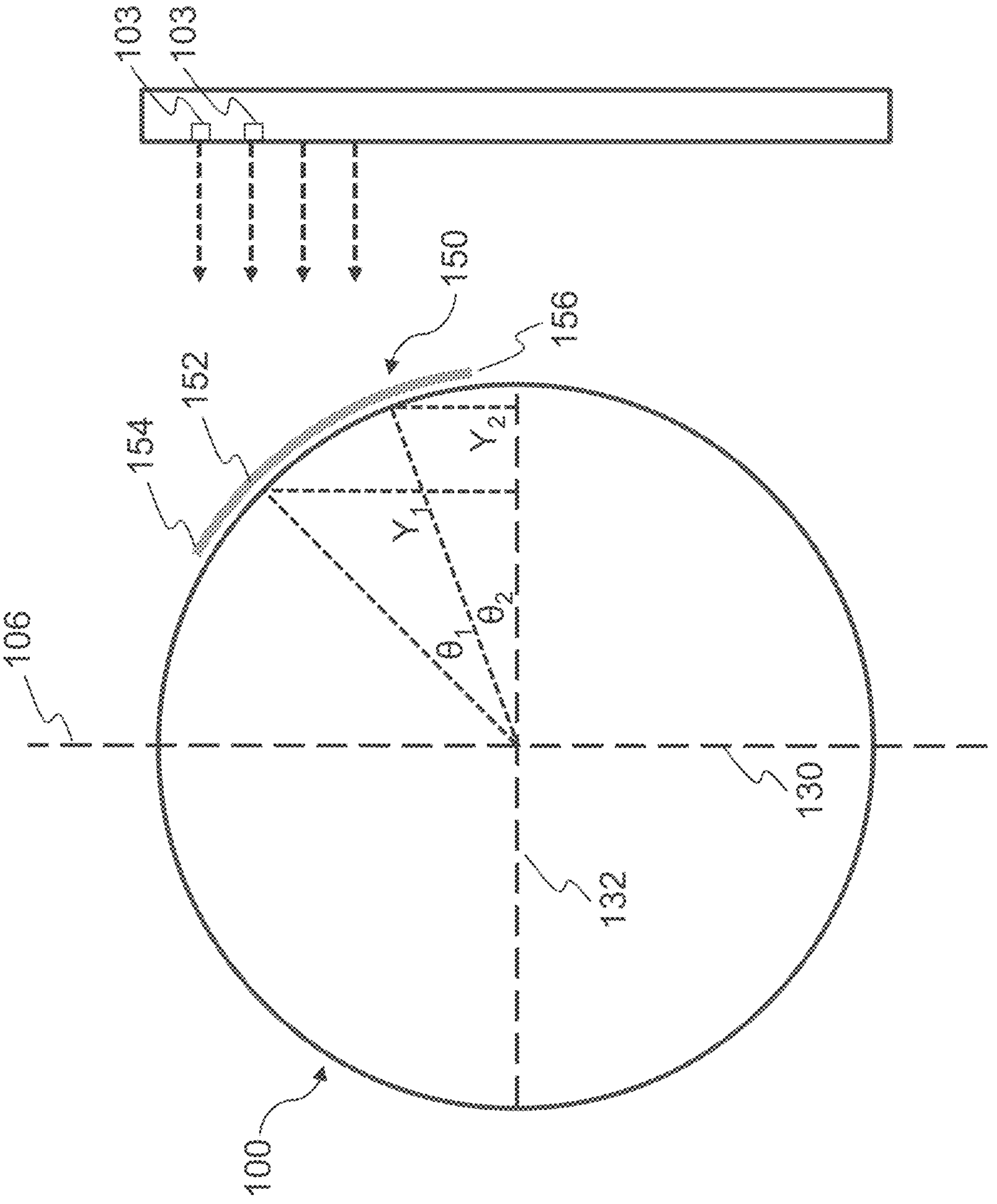
FIG. 3 illustrates a ball with a printed image located above a central axis of the ball according to some embodiments.

Referring now to the Figures, FIGS. 1-3 illustrate a single pass printer head 102 and a golf ball 100 comprising a printed image 150 according to some embodiments. Ball 100 can be located on a ball holder 116. The ball holder 116 can be connected to a digital encoder 120 that tracks the precise orientation of the golf ball 100 while ball 100 rotates on a rotation axis 106. In some embodiments, ball holder 116 can rotate ball 100 on rotation axis 106.

In some embodiments, rotation axis 106 can be a first central axis 130 of golf ball 100. In some embodiments, rotation axis 106 can be a second central axis 132 of golf ball 100. In some embodiments, rotation axis 106 can be the central axis of ball 100 that is perpendicular to the direction at which ink is ejected from nozzles 103 of printer head 102. In some embodiments, rotation axis 106 can be a central vertical axis of ball 100. In some embodiments, rotation axis 106 can be a central horizontal axis of ball 100. In some embodiments, rotation axis 106 can be an axis of ball 100 extending through a top pole and a bottom pole of the ball 100.

For purposes of the present disclosure, ball 100 comprises at least the following two central axes: first central axis 130 and second central axis 132 perpendicular to the first central axis 130. In some embodiments, first central axis 130 can be a central vertical axis of ball 100 and second central axis 132 can be a central horizontal axis of ball 100. In some embodiments, first central axis 130 can be a central horizontal axis of ball 100 and second central axis 132 can be a central vertical axis of ball 100. As used herein, unless specified otherwise, first central axis 130 is a central axis of ball 100 that is perpendicular to the direction at which ink is ejected from nozzles 103 of printer head 102.

Golf ball 100 rotates on rotation axis 106 at a rate of rotation while ink droplets 108 are ejected from nozzles 103 of printer head 102. A throw distance 110 for the ink droplets is defined as the distance between the closest point 114 on the golf ball 100 and the closest point on the printer head 102. In other words, with a relatively flat printer head 102 and a golf ball 100, the throw distance 110 is the distance between the widest part of the golf ball 100 and the printer head 102, as shown for example in FIG. 1. In some embodiments, throw distance 110 can range from 0 mm to 10 mm, from 0.5 mm to 1.5 mm, from 0.1 mm to 7 mm, or from 0.1 and 5 mm. In some embodiments, throw distance 110 can range from 0 mm to 2 mm, from 0 mm to 1 mm, from 0.1 mm to 1 mm, or from 0.5 to 1 mm. In some embodiments, throw distance 110 can be about 0.8 mm.

The distance ink droplets 108 travel between the ball 100 and the printer head 102 increases or decreases depending on the curvature of the ball's surface at the particular location at which an ink droplet 108 is printed on the ball's surface. For example, at a second reference point 124 illustrated in FIG. 1 located away from the closest point 114, an ink droplet 108 will have to travel farther to reach the ball's surface. Because of having a farther distance to travel, one or more parameters for ejection of an ink droplet 108 intended to print at the second reference point 124 can be tailored as described herein.

In some embodiments, the rotation rate of golf ball 100 as it rotates on rotation axis 106 can range from 1 to 7 revolutions per second (rps) or from 60 revolutions per minute to 420 revolutions per minute (rpm). In some embodiments, the revolutions per second can range from 2 to 3 rps, from 0.1 rps to 1 rps, or from 0.2 rps to 0.5 rps. In some embodiments, the rotation rate can range from 1 rpm to 400 rpm, from 10 rpm to 300 rpm, from 50 rpm to 320 rpm, from 80 rpm to 180 rpm, or from 120 rpm to 180 rpm. In some embodiments, ball 100 can rotate on rotation axis 106 at a rate of about 160 revolutions per minute. In some embodiments, ball 100 can rotate on rotation axis 106 at a rate ranging from 100 revolutions per minute to 200 revolutions per minute.

In some embodiments, the ball rotation rates described herein can be for a ball circumference of about 13.4 cm and a ball diameter between 1.678 inches (42.6 mm) to 1.688 inches (42.9 mm). In some embodiments, the ball diameter can be 1.683 inches (42.7 mm) with a plus or minus tolerance of 0.005 inches (0.127 mm).

In some embodiments, ball 100 can comprise a diameter ranging from 1.678 inches (42.6 mm) to 1.688 inches (42.9 mm). In some embodiments, the ball 100 can comprise a diameter of 1.683 inches (42.7 mm) with a plus or minus tolerance of 0.005 inches (0.127 mm). In some embodiments, ball 100 can comprise a diameter ranging from 42 mm to 43 mm.

In some embodiments, the print rate or scan rate of the printer head 102 can range from 10 cm/s (centimeters per second) to 100 cm/s, from 60 cm/s to 90 cm/s, or from 75 cm/s and 85 cm/s. The print rate or scan rate is how quickly the printer head 102 can print an image on a surface without seeing significant distortions in the image.

In some embodiments, the dispense rate or the velocity of ink droplets ejected from nozzles 103 can range from 2 m/s (meters per second) to 10 m/s, from 3 m/s to 9 m/s, from 4 m/s to 8 m/s, or from 5 m/s to 7 m/s.

In some embodiments, the volume of a single ink droplet 108 ejected from nozzles 103 can range from 6 to 160 picoliters, from 0 to 200 picoliters, from 50 to 150 picoliters, from 6 to 42 picoliters, from 12 to 84 picoliters, from 40 to 160 picoliters, or from 75 to 125 picoliters. In some embodiments, the volume of a single ink droplet 108 ejected from nozzles 103 can range from 6 to 36 picoliters, from 12 to 36 picoliters, from 18 to 36 picoliters, from 24 to 36 picoliters, from 30 to 36 picoliters, from 6 to 30 picoliters, from 6 to 24 picoliters, from 6 to 18 picoliters, or from 6 to 12 picoliters. In some embodiments, the volume of a single ink droplet 108 ejected from nozzles 103 can range from 6 to 48 picoliters, from 12 to 48 picoliters, from 18 to 48 picoliters, from 24 to 48 picoliters, from to 48 picoliters, from 36 to 48 picoliters, or from 6 to 42 picoliters.

Each ink droplet 108 printed by nozzles 103 can correlate to a pixel for a printed image 150 on ball 100. Pixels are digital information used by a single pass printing system comprising printer head 102 to print an image 150 on ball 100. The system can convert pixels for an image 150 into dots that correspond to ink droplets 108 printed by print head 102. Each pixel can comprise one or more ink droplets 108 printed by print head 102.

In some embodiments, the resolution of the printed image 150 on golf ball 100 can range from 100 to 1400 dots per inch (dpi), from 200 dpi to 400 dpi, from 300 dpi to 400 dpi, from 320 dpi to 390 dpi, from 1000 dpi to 1300 dpi, from 350 dpi to 370 dpi, from 700 dpi to 800 dpi, or from 740 dpi to 780 dpi. In some embodiments, the resolution of the printed image 150 on the golf ball 100 can be at least 360 dpi. In some embodiments, the resolution of the printed image 150 on the golf ball 100 can be about 360 dpi. In some embodiments, the resolution of the printed image 150 on the golf ball 100 can be at least 760 dpi. In some embodiments, the resolution of the printed image 150 on the golf ball 100 can be about 760 dpi. In some embodiments, the resolution of the printed image 150 on the golf ball 100 can range from about 360 dpi to about 760 dpi.

In some embodiments, the firing frequency for nozzles 103 of the printer head 102 can range from 6 to 12 kHz.

The one or more images 150 can be located on a surface 101 of ball 100. In some embodiments, the one or more images 150 can be located on a visible surface of ball 100. In some embodiments, the one or more images 150 can be located on an outer surface of the golf ball 100. In some embodiments, the one or more images 150 can be located below the outer surface of the golf ball 100. For example, in some embodiments, the golf ball 100 can include a dimpled surface and a protective coating layer disposed on the dimpled surface and defining the outer surface of the golf ball 100. In such embodiments, the one or more images 150 can be located on the dimpled surface covered by the protective coating layer.

In some embodiments, golf ball 100 can be pre-treated to apply a charge to the surface on which the one or more images 150 is to be printed to improve ink adhesion. Some examples of pre-treatment methods include corona discharge, flame, or plasma pretreatment.

In some embodiments, the one or more images 150 can be printed using a UV curable ink. In such embodiments, at least one UV pinning operation can be used to pre-cure the UV curable ink before a final UV curing operation.

As discussed above, one or more images 150 can be printed on the ball 100 with a plurality of nozzles 103 while the ball 100 is rotating, for example on axis 106. In some embodiments, nozzles 103 can comprise a vertical array of nozzles 103. When printing an image 150 on the ball 100, the image 150 can be defined by an image area 152 on the ball 100 comprising a top boundary line 154 and a bottom boundary line 156.

Figure 4:
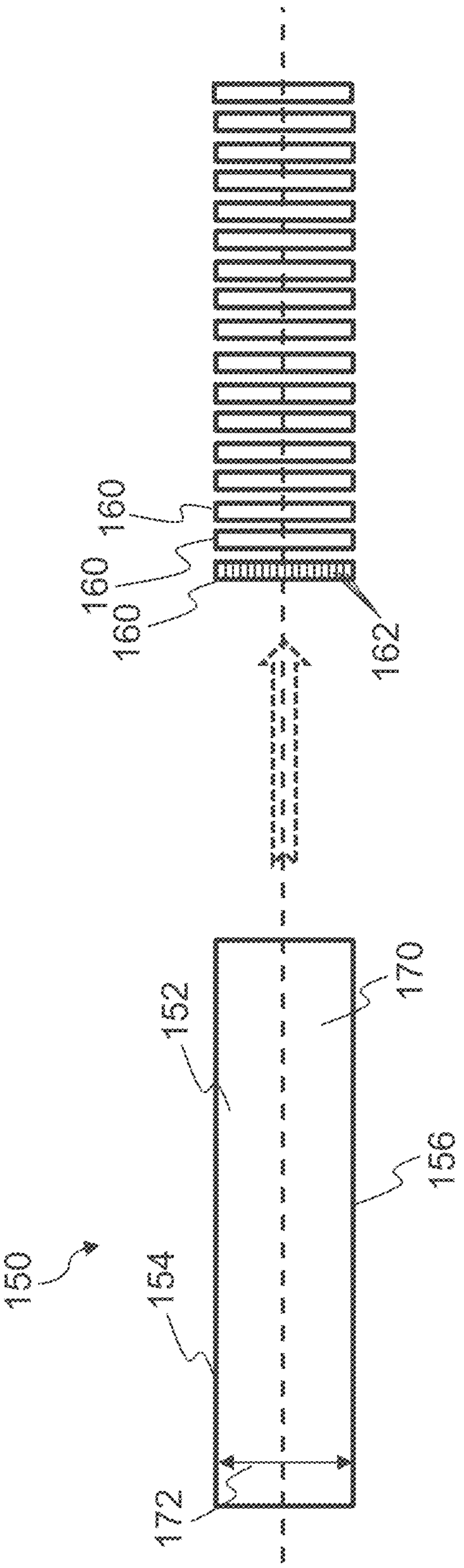
FIG. 4 illustrates a printed image and image lines according to some embodiments.
Figure 5:
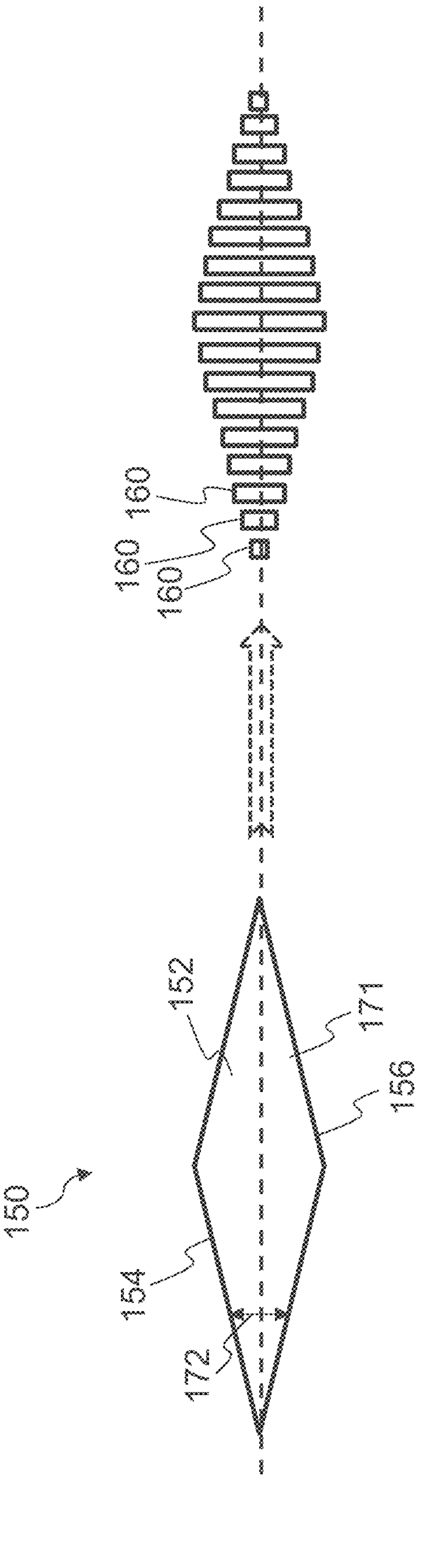
FIG. 5 illustrates a printed image and image lines according to some embodiments.

Referring now to FIGS. 4 and 5, image area 152 can comprise, for example, a logo, a trademark, a technology name, and alignment feature (for example an alignment arrow or band), a custom image, a ball number, or a combination thereof. In some embodiments, image area 152 can comprise an image band 170, 171 that warps around all or a portion of ball 100. In some embodiments, image area 152 can comprise a continuous image band 170 wrapped around all or a portion of ball 100 and having a constant height 172. In some embodiments, image area 152 can comprise a continuous image band 171 wrapped around all or a portion of ball 100 and having a varying height 172.

In some embodiments, height 172 can range from 0.5 mm to 35 mm or from 1 mm to 30 mm. In some embodiments, image band 170, 171 can comprise multiple bands. For example, in some embodiments, image band 170, 171 can comprise three bands. In such embodiments, the height of each of the two outer bands can range from 2 mm to 30 mm, from 10 mm to 30 mm, from 5 mm to 25 mm, from 15 mm to 25 mm, or from 15 mm to 20 mm. Also in such embodiments, the height of the center band can range from 0.5 mm to 15 mm, from 1 mm to 12 mm, from 1 mm to 10 mm, or from 1 mm to 8 mm. In embodiments comprising multiple bands, the total height of image band 170, 171 can range from 1 mm to 40 mm, from 5 mm to 35 mm, from 10 mm to 30 mm, or from 15 mm to 25 mm.

In some embodiments, image area 152 can be a physically discrete design that has a border and includes at least two individual design elements. In such embodiments, one of the individual design elements can be a border design element. In some embodiments, image area can be an image as described in U.S. Pat. No. 11,013,961, issued May 25, 2021, which is incorporated by reference in its entirety.

In some embodiments, image band 170, 171 can comprise a continuous or discontinuous band that wraps completely around ball 100 (i.e., around an entire circumference of the golf ball). In such embodiments, a first portion of image band 170, 171 may overlap a second portion of image band 170, 171. In some embodiments, image band 170, 171 can comprise an alignment feature.

The top boundary line 154 for image area 152 is the line defining the shape of the image area 152 at the edge defining a top half of the image area 152. Similarly, bottom boundary line 156 for image area 152 is the line defining the shape of the image area 152 at the edge defining a bottom half of the image area 152. Together, the top boundary line 154 and the bottom boundary line 156 define the perimeter shape of the image area 152.

For example, the image band 170 illustrated in FIG. 4, has a rectangular perimeter shape defined by top boundary line 154 and bottom boundary line 156. As another example, image band 171 illustrated in FIG. 5, has a diamond-shaped perimeter defined by top boundary line 154 and bottom boundary line 156.

The image area 152 defining image 150 can be printed by printing ink droplets 108 correlating to pixels 162 arranged in consecutive image lines 160 as the ball 100 rotates.

Each image line 160 is defined by a plurality of pixels disposed between the top boundary line 154 and the bottom boundary line 156 of the image area 152. Each pixel 162 in each image line 160 correlates to one or more ink droplets 108 printed by one of the respective nozzles 103 of printer head 102. Each image line 160 can be disposed between the top boundary line 154 and the bottom boundary line 156 in a straight line in the direction of the height (for example, height 172) of image area 152.

In some embodiments, pixels 162 defining an image line 160 can comprise the same color pixels. In some embodiments, pixels 162 defining an image line 160 can comprise different color pixels.

For example, as illustrated in FIG. 4, image band 170 can be printed by printing consecutive image lines 160. Similarly, as illustrated in FIG. 5, image band 171 can be printed by printing consecutive image lines 160. The height of an image area 152 (for example, height 172) at any particular image line 160 is defined by the distance between the top boundary line 154 and bottom boundary line 156 along the particular image line 160.

In some embodiments, the number of pixels 162 printed in image lines 160 can be based on a curvature the surface of ball 100. In such embodiments, due to the curvature, the image area 152 on ball 100 can be translated to a flat image comprising image lines 160 that take into account the ball's curvature. For example, to print image band 170 having a constant height 172 on ball 100, the image area 152 for band 170 can be translated into flat image 164 illustrated in FIG. 6. By translating the image area 152 into a flat image and printing droplets correlating to pixels in image lines 160 based on the flat image, image distortion due to the curvature of the ball's surface can be limited or avoided.

In some embodiments, translating the image area 152 into a flat image can comprise arranging pixels in image lines 160 comprising a plurality of image lines 160 having an image line height 165 less than the height 172 of an image area 152 on the ball 100 at locations corresponding to the respective image lines 160 on ball 100. Arranging image lines 160 comprising a plurality of image lines 160 having an image line height 165 less than the height 172 on ball 100 can result in a flat image comprising negative spaces 161, as shown for example in FIG. 6. In some embodiments, pixels can be arranged in image lines 160 having image line heights 165 that vary in regular intervals 167 relative to height 172 of an image area 152, as shown for example in FIG. 6. In some embodiments, pixels can be arranged in image lines 160 having image line heights 165 that vary in irregular intervals relative to height 172 of an image area 152. In addition to comprising a plurality of image lines 160 having an image line height 165 less than the height 172 of an image area 152, the flat image can comprise one or more image lines 160 having an image line height 165 equal to the height 172 of an image area 152 at a location corresponding to the image line 160 on ball 100.

Figure 6:
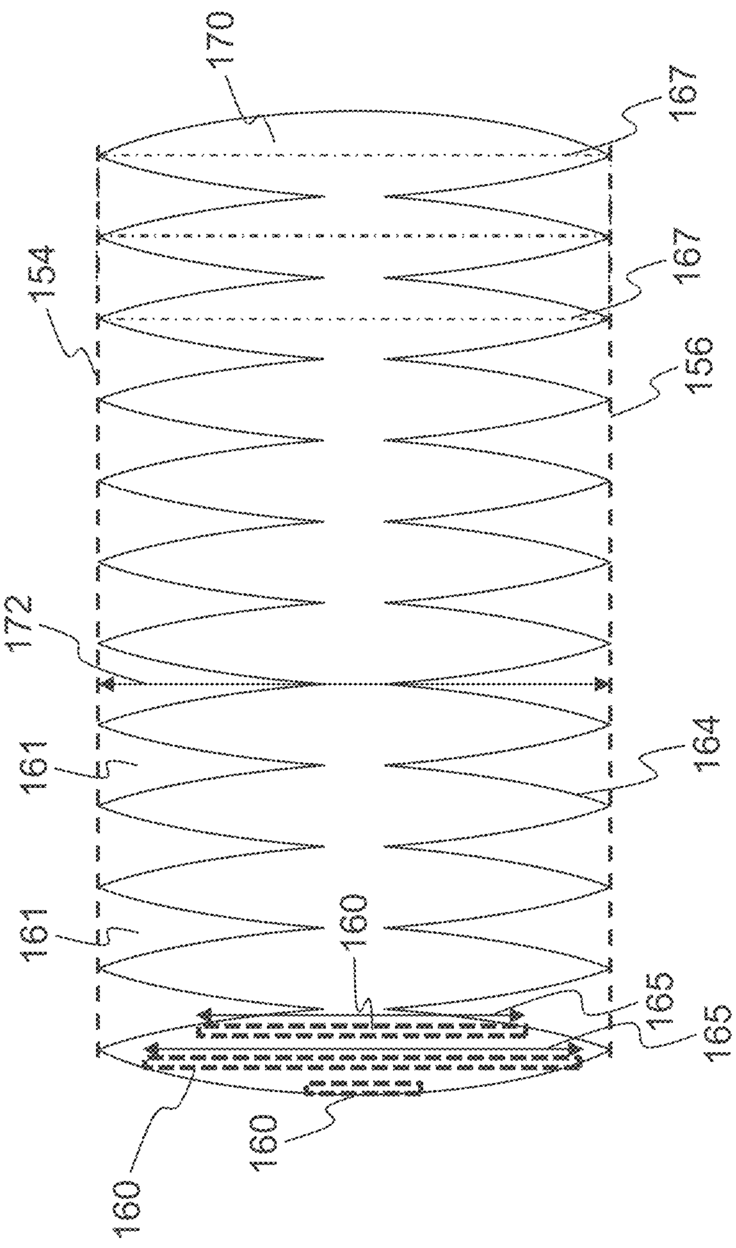
FIG. 6 illustrates image lines for a flat image according to some embodiments.

As shown in FIG. 6, image band 170 having a constant height 172 can be translated into a flat image 164 comprising consecutive image lines 160 having a different number of pixels, thereby creating image lines 160 having different heights 165. FIG. 6 shows some exemplary image lines 160 for illustration purposes. When the consecutive image lines 160 having the different number of pixels are printed on ball 100, image band 170 having a constant height 172 will appear on the ball's surface. While FIG. 6 shows flat image 164 for a constant height image band 170, it is appreciated that any image area can be similarly translated into a flat image for purposes of single pass printing a curved ball surface as described herein.

For purposes of this disclosure, the center location of each pixel 162 in an image line 160 correlating to ink droplets printed on the ball 100 is defined by (i) a positive angle θ or a negative angle −θ, and (ii) a positive linear distance Y from the second central axis 132 of the ball 100 or a negative linear distance −Y from the second central axis 132. As used herein, θ, −θ, Y and −Y are shown in FIGS. 2 and 3 for two exemplary image areas and are defined by the following equations, where R is the radius of the ball measured on the second central axis.

$$\sin(\theta) = \frac{Y}{R} \quad \text{(Equation 1)}$$

$$\sin(-\theta) = \frac{-Y}{R} \quad \text{(Equation 2)}$$

In some embodiments, a nozzle firing time of each of the plurality of nozzles 103 can be based on the center location of the pixel correlating to an ink droplet the nozzle 103 prints.

As used herein, a "nozzle firing time" means the relative timing of a nozzle fire for each nozzle 103 in a plurality of nozzles that prints ink droplets correlating to pixels in a respective image line 160. The nozzle(s) 103 that are fired first have a nozzle firing time of "zero." Each nozzle 103 fired after the first nozzle(s) 103 has a nozzle firing time defined by the time between "zero" and the time at which the later nozzle 103 is fired.

In some embodiments, the nozzle firing time difference between two nozzles 103 can be at least about 1 microsecond. In some embodiments, the nozzle firing time difference between two nozzles 103 can be about 1.6 microseconds. In some embodiments, the nozzle firing time difference between two nozzles 103 can in a range of from 1 microsecond to 2 microseconds.

In some embodiments, the nozzle firing time difference between two nozzles 103 fired consecutively can be at least about 1 microsecond. In some embodiments, the nozzle firing time difference between two nozzles 103 fired consecutively can be about 1.6 microseconds. In some embodiments, the nozzle firing time difference between two nozzles 103 fired consecutively can in a range of from 1 microsecond to 2 microseconds.

In some embodiments, the nozzle firing time of each of the plurality of nozzles 103 can be based on an absolute value of Y or −Y (|Y|) for the pixel correlating to an ink droplet the nozzle 103 prints. In some embodiments, the nozzle firing time for a first nozzle 103 printing an ink droplet correlating to a first pixel located at a higher |Y| is earlier than the nozzle firing time for a second nozzle 103 printing an ink droplet correlating to a second pixel located at a lower |Y|. For example, in such embodiments, the nozzle firing time for a first nozzle 103 can at least about 1.6 microseconds earlier than the nozzle firing time for the second nozzle 103. In some embodiments, the nozzle firing time for the first nozzle 103 can be about 1.6 microseconds earlier than the nozzle firing time for the second nozzle 103.

In some embodiments, the nozzle firing time of each of the plurality of nozzles 103 can be a function of the absolute value of Y or −Y (|Y|) for the respective pixels in the image line. In such embodiments, as |Y| decreases, nozzle firing time can increase based a particular relationship between nozzle firing time and |Y|, for example a linear relationship or an exponential relationship. In some embodiments, the nozzle firing time of each of the plurality of nozzles 103 can be proportional to the absolute value of Y or −Y (|Y|) for the respective pixels in the image line. In such embodiments, as |Y| decreases, nozzle firing time can increase.

As a non-limiting example, the nozzle firing time for a first nozzle 103 printing an ink droplet correlating to a first pixel located at the highest |Y| value for an image line 160 of an image 150 can be fired at time zero, the nozzle firing time for a second nozzle 103 printing an ink droplet correlating to a second pixel located immediately below the first pixel in the image line 160 can be about 1.6 microseconds, and the nozzle firing time for a third nozzle 103 printing an ink droplet correlating to a third pixel located immediately below the second pixel in the image line 160 can be about 3.2 microseconds.

By varying the nozzle firing time based on the absolute value |Y|, the distance that ink droplets must travel from the nozzle 103 to the surface of the ball 100 can be accounted for such that droplets correlating to pixels in a particular image line 160 will contact the surface of ball 100 at essentially the same time. By causing the ink droplets to contact the surface of ball 100 at essentially the same time, potential distortion or defects in image 150 can be reduced or avoided.

In some embodiments, a nozzle firing frequency of each of nozzles 103 can be based on the center location of the pixel correlating to an ink droplet the nozzle 103 prints. In such, embodiments, the nozzle firing frequency can be varied to print ink droplets correlating to pixels in consecutive image lines 160 having a different number of pixels printed on ball 100. In some embodiments, the nozzle firing frequency of nozzles 103 can be a function of the absolute value of Y or −Y (|Y|) for respective pixels in image lines 160. In such embodiments, as |Y| decreases, nozzle firing frequency can increase based a particular relationship between nozzle firing frequency and |Y|, for example a linear relationship or an exponential relationship. In some embodiments, the nozzle firing frequency of nozzles 103 can be proportional to the absolute value of Y or −Y (|Y|) for respective pixels in image lines 160. In such embodiments, as |Y| decreases, nozzle firing frequency can increase.

In some embodiments, the nozzle firing time of each of the plurality of nozzles 103 can be based on an absolute value of θ or −θ (|θ|) for the pixel correlating to an ink droplet the nozzle 103 prints. In some embodiments, the nozzle firing time for a first nozzle 103 printing an ink droplet correlating to a first pixel located at a higher |θ| is earlier than the nozzle firing time for a second nozzle 103 printing an ink droplet correlating to a second image located at a lower |θ|. For example, in such embodiments, the nozzle firing time for the first nozzle 103 can at least about 1.6 microseconds earlier than the nozzle firing time for the second nozzle 103. In some embodiments, the nozzle firing time for the first nozzle 103 can be about 1.6 microseconds earlier than the nozzle firing time for the second nozzle 103.

In some embodiments, the nozzle firing time of each of the plurality of nozzles 103 can be a function of the absolute value of θ or −θ (|θ|) for the respective pixels in the image line. In such embodiments, as |θ| decreases, nozzle firing time can increase based a particular relationship between nozzle firing time and |θ|, for example a linear relationship or an exponential relationship. In some embodiments, the nozzle firing time of each of the plurality of nozzles 103 can be proportional to the absolute value of θ or −θ (|θ|) for the respective pixels in the image line. In such embodiments, as |θ| decreases, nozzle firing time can increase.

As a non-limiting example, the nozzle firing time for a first nozzle 103 printing an ink droplet correlating to a first pixel located at the highest |θ| value for an image line 160 of an image 150 can be fired at time zero, the nozzle firing time for a second nozzle 103 printing an ink droplet correlating to a second pixel located immediately below the first pixel in the image line 160 can be about 1.6 microseconds, and the nozzle firing time for a third nozzle 103 printing an ink droplet correlating to a third pixel located immediately below the second pixel in the image line 160 can be about 3.2 microseconds.

By varying the nozzle firing time based on the absolute value |θ|, the distance that ink droplets must travel from the nozzle 103 to the surface of the ball 100 can be accounted for such that droplets correlating to pixels in a particular image line 160 will contact the surface of ball 100 at essentially the same time.

In some embodiments, a nozzle firing frequency of each of nozzles 103 can be based on the center location of the pixel correlating to an ink droplet the nozzle 103 prints. In such embodiments, the nozzle firing frequency can be varied to print ink droplets correlating to pixels in consecutive image lines 160 having a different number of pixels printed on ball 100. In some embodiments, the nozzle firing frequency of nozzles 103 can be a function of the absolute value of θ or −θ (|θ|) for respective pixels in image lines 160. In such embodiments, as |θ| decreases, nozzle firing frequency can increase based a particular relationship between nozzle firing frequency and |θ|, for example a linear relationship or an exponential relationship. In some embodiments, the nozzle firing frequency of nozzles 103 can be proportional to the absolute value of θ or −θ (|θ|) for respective pixels in image lines 160. In such embodiments, as |θ| decreases, nozzle firing frequency can increase.

In some embodiments, the nozzle firing frequency can be varied to print ink droplets correlating to pixels in consecutive image lines 160 such that negative spaces would result in a translated flat image for an image 150, for example negative spaces 161 shown in FIG. 6. In some embodiments, the nozzle firing frequency can be varied at regular intervals to create pixels arranged in image lines 160 having image lines heights 165 that vary relative to an intended image area height 172 in regular intervals, as shown for example in FIG. 6. In some embodiments, the nozzle firing frequency can be varied at irregular intervals to create pixels arranged in image lines 160 having image lines heights 165 that vary relative to an intended image area height 172 in regular intervals.

In some embodiments, a volume of the ink droplets printed the plurality of nozzles 103 can be based on the center locations of the pixels correlating to the ink droplets the nozzles 103 print.

In some embodiments, the a number of ink droplets printed within a droplet volume range printed by the plurality of nozzles 103 can vary based on an absolute value of Y or −Y (|Y|) for the pixels correlating to the ink droplets the nozzles 103 print. In some embodiments, as the absolute value (|Y|) increases, a number of ink droplets printed within a first droplet volume range increases while a number of ink droplets printed within a second droplet volume range decreases.

In some embodiments, the relationship between ink droplet volume and |Y| can be a stepwise function. In such embodiments, the range of |Y| values from zero to maximum Y (for images comprising at least a portion located above central axis 132) and/or from zero to minimum Y (for images comprising at least a portion located below central axis 132) can be split into intervals, with a number of ink droplets printed within a first droplet volume varying across the different intervals.

In some embodiments, a |Y| value interval can range from a 1-mm interval to a 2-mm interval, from a 1-mm interval to a 3-mm interval, from a 1-mm interval to a 4-mm interval, from a 1-mm interval to a 5-mm interval, from a 1-mm interval to a 6-mm interval, from a 1-mm interval to a 7-mm interval, from a 1-mm interval to a 8-mm interval, from a 1-mm interval to a 9-mm interval, or from a 1-mm interval to a 10-mm interval.

In some embodiments, an ink droplet volume range can be a 4-picoliter range within 6 to 48 picoliters, a 5-picoliter range within 6 to 48 picoliters, a 6-picoliter range within 6 to 48 picoliters, a 8-picoliter range within 6 to 48 picoliters, or a 10-picoliter range within 6 to 48 picoliters. For example, a 4-picoliter range within 6 to 48 picoliters can be from 6 to 10 picoliters, from 10 to 14 picoliters, from 14 to 18 picoliters, from 18 to 22 picoliters, from 22 to 26 picoliters, from 26 to 30 picoliters, or from 26 to 30 picoliters. In some embodiments, an ink droplet volume range can be a 4-picoliter range within any picoliter range disclosed herein. In some embodiments, an ink droplet volume range can be a 6-picoliter range within any picoliter range disclosed herein. In some embodiments, an ink droplet volume range can be a 8-picoliter range within any picoliter range disclosed herein.

As a non-limiting example, an image 150 printed based on image lines comprising |Y| values ranging from zero to 10 mm can be printed with five 2-mm |Y| value intervals where the number of ink droplets printed within an ink droplet volume range from 6 to 10 picoliters decreases for each interval as the |Y| value intervals increase from 0 mm.

In some embodiments, the dpi of ink droplets printed by the plurality of nozzles 103 can vary based on an absolute value of Y or −Y (|Y|) for the pixels correlating to the ink droplets the nozzles 103 print. In some embodiments, as the absolute value (|Y|) increases, the dpi of ink droplets printed can decrease. In some embodiments, the dpi of ink droplets can range from about 360 dpi to about 760 dpi and decreases as the absolute value (|Y|) increases. In some embodiments, the dpi of ink droplets can range from about 100 dpi to about 760 dpi and decreases as the absolute value (|Y|) increases. In some embodiments, the dpi of ink droplets can range from about 100 dpi to about 360 dpi and decreases as the absolute value (|Y|) increases.

In some embodiments, single pass printing methods described herein can print one or more images 150 that wrap around ball 100 such that a first portion of the image overlaps a second portion of the image. In such embodiments, the first portion and the second portion can overlap in an overlap area on ball 100. In some embodiments, image lines 160 correlating to the first portion of the image 150 and the second portion of the image 150 can be printed with a smaller volume of ink compared to image lines 160 defining the remainder of the image 150.

Figure 7:
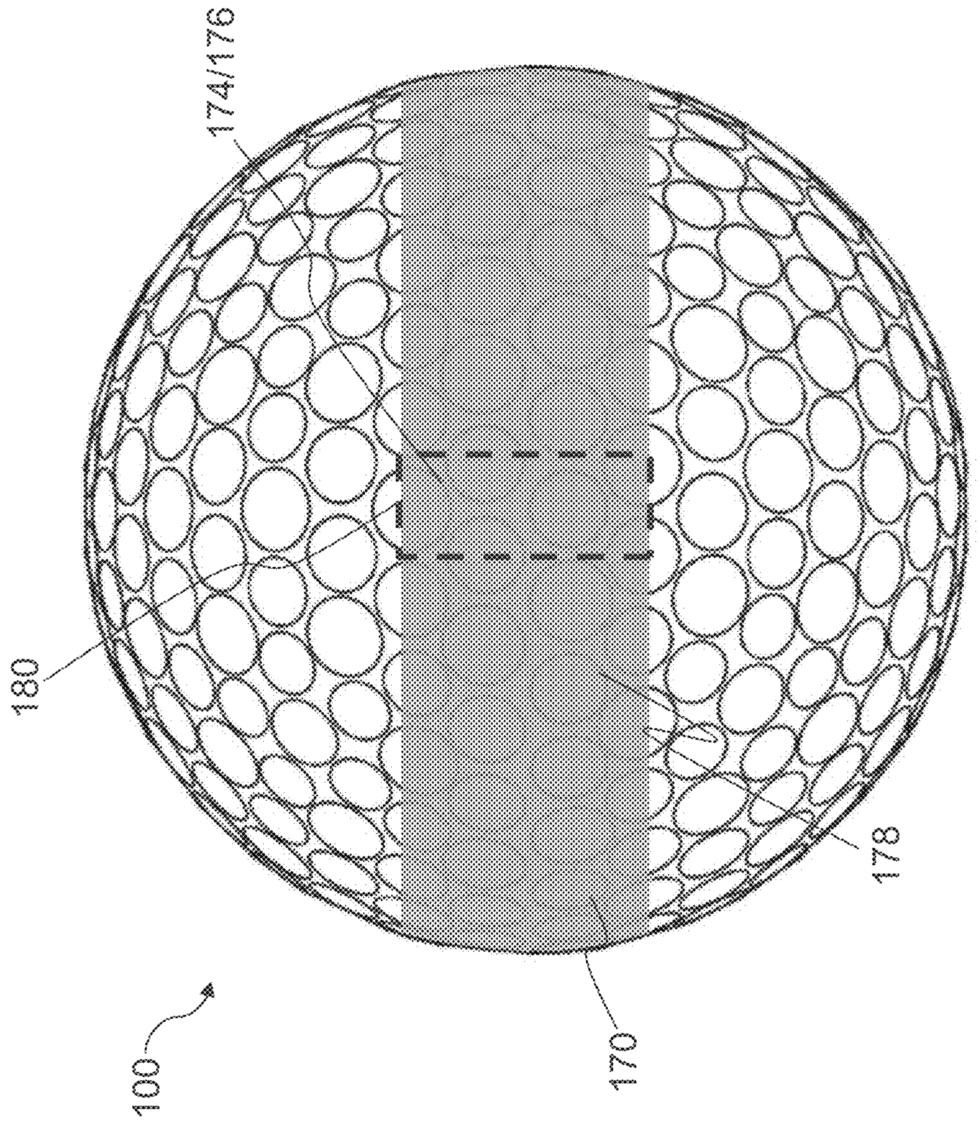
FIG. 7 illustrates a ball with a printed image having an overlap area according to some embodiments.
Figure 8:
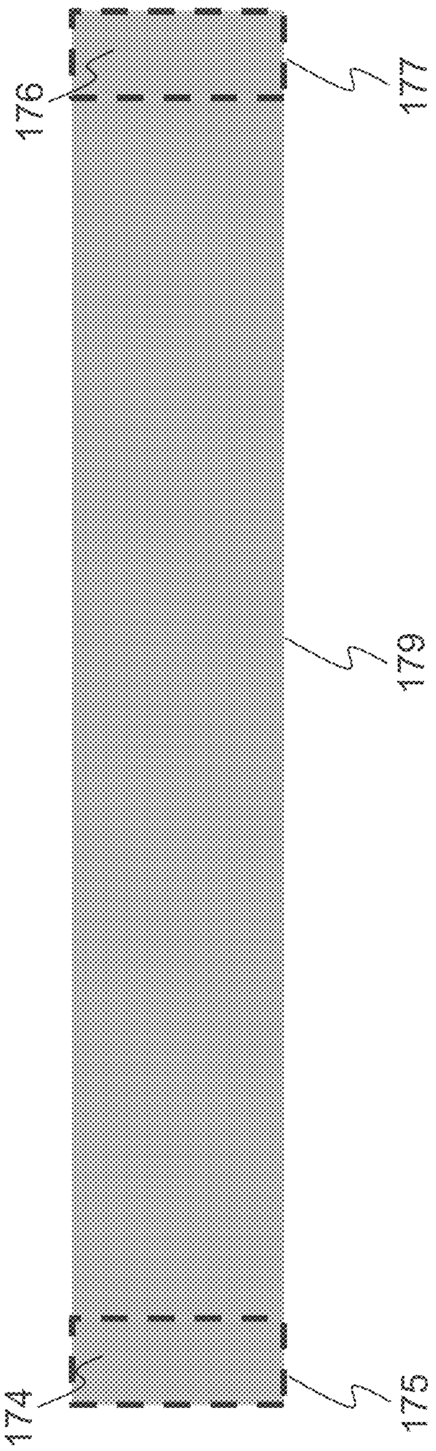
FIG. 8 illustrates the image of FIG. 7 as a flat image.

For example, as illustrated in FIGS. 7 and 8, in some embodiments, single pass printing methods described herein can print one or more continuous image bands (for example, image band 170) that wrap around the ball 100 such that a first portion 174 of the image band 170 overlaps a second portion 176 of the image band 170. In such embodiments, first portion 174 and second portion 176 can overlap in an overlap area 180 on ball 100. In some embodiments, image lines 160 correlated to the first portion 174 of image band 170 and the second portion 176 of image band 170 can be printed with a smaller volume of ink compared to image lines 160 correlating to the remainder of image band 170.

In some embodiments, golf ball 100 can comprise a single-pass-printed image 150 comprising an image area 152 that wraps around ball 100 such a first portion of the image area 152 overlaps a second portion of the image area 152 at overlap area 180. In some embodiments, the first portion can comprise a first ink density, the second portion can comprise a second ink density, and a third portion 178 of image area 152 located between the first portion and the second portion can comprise a third ink density. In such embodiments, the third ink density can be greater than both the first ink density and the second ink density. In some embodiments, the first ink density can be 40% to 60% of the third ink density. In some embodiments, the second ink density can be 40% to 60% of the third ink density. In some embodiments, the first ink density can be 40% to 60% of the third ink density and the second ink density can be 40% to 60% of the third ink density. In some embodiments, the sum of the first ink density and the second ink density equals the third ink density.

In some embodiments, the first portion of the image area 152 can comprise a first ink layer and the second portion of the image area 152 can comprise a second ink layer that overlaps the first ink layer. Together, the first ink layer and the second ink layer can define a total thickness of image area 152 printed on a surface of ball 100 in overlap area 180. In some embodiments, a third portion of the image area 152 can comprise only one ink layer. In such embodiments, the thickness of the single ink layer of the third portion can be equal to the sum of the thickness of the first ink layer and the thickness of the second ink layer.

By printing such that portions of image area 152 overlap each other, the appearance of a seam in the image 150 can be limited or prevented. In addition, by varying the ink density printed in overlap area 180 as described herein, the appearance of a seam in the image 150 can be limited or prevented.

In some embodiments, golf ball 100 can comprise a single-pass-printed image 150 comprising a continuous image band 170 that wraps around ball 100 such that first portion 174 of image band 170 overlaps second portion 176 of image band 170 at overlap area 180. In some embodiments, first portion 174 can comprise a first ink density, second portion 176 can comprise a second ink density, and a third portion 178 of the image band 170 located between first portion 174 and second portion 176 can comprise a third ink density. In such embodiments, the third ink density can be greater than both the first ink density and the second ink density. In some embodiments, the first ink density can be 40% to 60% of the third ink density. In some embodiments, the second ink density can be 40% to 60% of the third ink density. In some embodiments, the first ink density can be 40% to 60% of the third ink density and the second ink density can be 40% to 60% of the third ink density. In some embodiments, the sum of the first ink density and the second ink density equals the third ink density.

In some embodiments, first portion 174 can comprise a first ink layer 175 and second portion 176 can comprise a second ink layer 177 that overlaps the first ink layer 175. Together, the first ink layer 175 and the second ink layer 177 can define a total thickness of image band 170 printed in overlap area 180. In some embodiments, third portion 178 of image band 170 can comprise only one ink layer 179. In such embodiments, the thickness of the single ink layer 179 of third portion 178 can be equal to the sum of the thickness of the first ink layer 175 and the thickness of the second ink layer 177.

Figure 9:
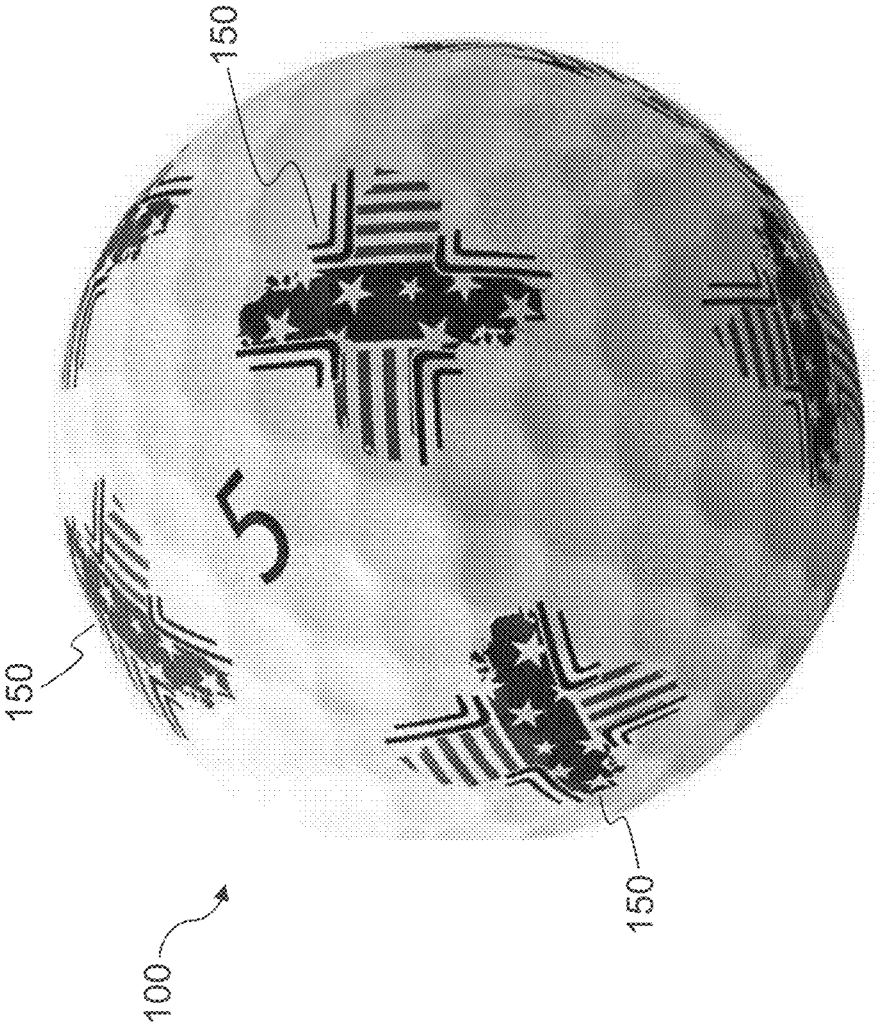
FIG. 9 illustrates a ball with multiple printed images according to some embodiments.

Any number of images 150 can be printed on ball 100 using the single pass printing methods as described herein. FIG. 9 illustrates a ball 100 comprising multiple images 150 according to some embodiments. In some embodiments, multiple images 150 can be printed simultaneously by one printer head 102. In some embodiments, multiple images 150 can be printed sequentially using multiple printer heads 102. In some embodiments, different portion of image(s) 150 can be printed using different printer heads 102. For example, different printer heads 102 can print differently colored portions of image(s) 150.

In some embodiments, a plurality of printer heads 102 can be utilized to print different colors. For example, in such embodiments, a printed image 150 comprising features printed with three different colors (for example, black, magenta, and cyan) can be printed using three different printer heads 102 arranged in a serial arrangement so as to apply each color in successive stages of printing. In some embodiments, the printer heads 102 can be capable of printing in at least five colors including cyan, magenta, yellow, black, and white. That said, it is possible to print in any number of colors beyond the CMYK inks depending on how many printer heads 102 are available.

In order to increase resolution of a printed image in the lateral sense, it is possible to add additional printer heads in the print direction and offset them by a certain number of pixels to double or triple the dots per inch (dpi) in the in track while running at maximum speed. The print width can also be increased by adding printer heads in the cross track to increase the print swath by a factor of the printer head width.

Figure 10:
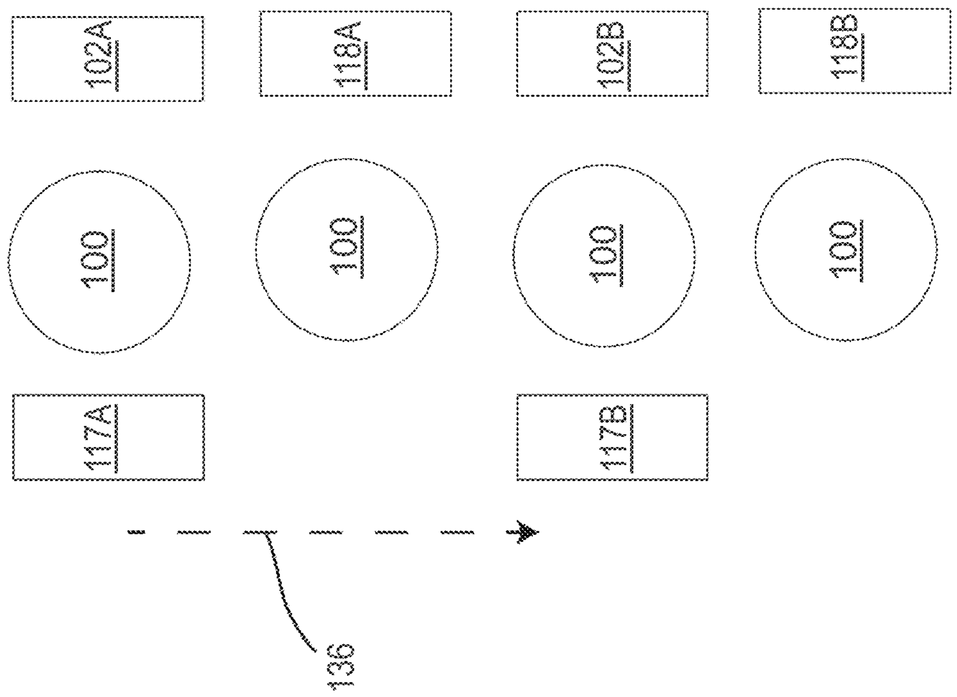
FIG. 10 illustrates a single pass printing layout according to some embodiments.

FIG. 10 illustrates a top view of the golf ball 100 as it moves along a linear direction 136 and passes adjacent to a plurality of printer heads 102 according to some embodiments. In some embodiments, a first printer head 102A at a first printer station can apply a first color (for example, yellow). After the first color is applied, the golf ball 100 can passes through a first ink curing station 118A before proceeding to a second printer head 102B at a second printer station to apply a second color (for example, magenta). After the second color is applied to the golf ball 100, ball 100 can be cured at a second ink curing station 118B. In some embodiments, the first and/or second ink curing stations 118A, 118B can perform a UV pinning operation where low power level UV light is applied. In some embodiments, the second ink curing station 118B can additionally or alternatively comprise a final curing station where a higher power level of UV light (when compared to the UV pinning operation) is applied to cure all the ink applied to golf ball 100. This process can be repeated for as many colors as required for printing a certain image. In some embodiments, there can be from 1 to 20 printer heads 102 and from 1 to 20 curing stations 118. In some embodiments, there can be two or more printer heads 102 per printer station applying at least two or more different colors on golf ball 100 simultaneously.

In some embodiments, a first printer head 102A at a first printer station can apply a first color (for example, yellow) over two or more rotations of ball 100 at the printer head. In such embodiments, a first set of ink droplets can be printed with a first set of nozzles 103 on the printer head 102A (for example, the odd numbered nozzles) during a first rotation of the ball 100 and a second set of ink droplets can be printed with a second set of nozzles 103 on the printer head 102A different from the first set (for example, the even numbered nozzles) during a second rotation of the ball 100. In some embodiments, the first printer head 102A can comprise an ink curing device 117A configured to cure the first set of ink droplets during the first rotation and cure the second set of ink droplets during the second rotation. In some embodiments, the ink curing device 117A can perform a UV pinning operation where a low power level UV light is applied. In some embodiments, the ink curing device 117A can perform a full UV curing operation. In some embodiments, the single pass printing system may not comprise an ink curing station 118 between the first printer head 102A and a second printer head 102B. Rather, the system can comprise a final UV curing station 118 positioned such that the ball 100 passes through the final UV curing station 118 after passing through the necessary number of printer heads needed to apply an image.

In some embodiments, after the first color is applied in two or more rotations at printer head 102A, the golf ball 100 can pass through a first ink curing station 118A before proceeding to a second printer head 102B to apply a second color (for example, magenta).

In some embodiments, the second printer head 102B can apply a second color (for example, magenta) over two or more rotations of ball 100 at the printer head. In such embodiments, a first set of ink droplets can be printed with a first set of nozzles 103 on the printer head 102B (for example, the odd numbered nozzles) during a first rotation of the ball 100 and a second set of ink droplets can be printed with a second set of nozzles 103 on the printer head 102B different from the first set (for example, the even numbered nozzles) during a second rotation of the ball 100. In some embodiments, the second printer head 102B can comprise an ink curing device 117B configured to cure the first set of ink droplets during the first rotation and cure the second set of ink droplets during the second rotation. In some embodiments, the ink curing device 117B can perform a UV pinning operation where a low power level UV light is applied. In some embodiments, the ink curing device 117B can perform a full UV curing operation. In some embodiments, the single pass printing system may not comprise an ink curing station 118 between the second printer head 102B and a third printer head.

In some embodiments, after the second color is applied in two or more rotations at printer head 102B, the golf ball 100 can pass to a third printer head. This process can be repeated for as many colors as required for printing a certain image. In some embodiments, there can be from 1 to 20 printer heads 102 and from 1 to 20 curing stations 118.

Figure 11:
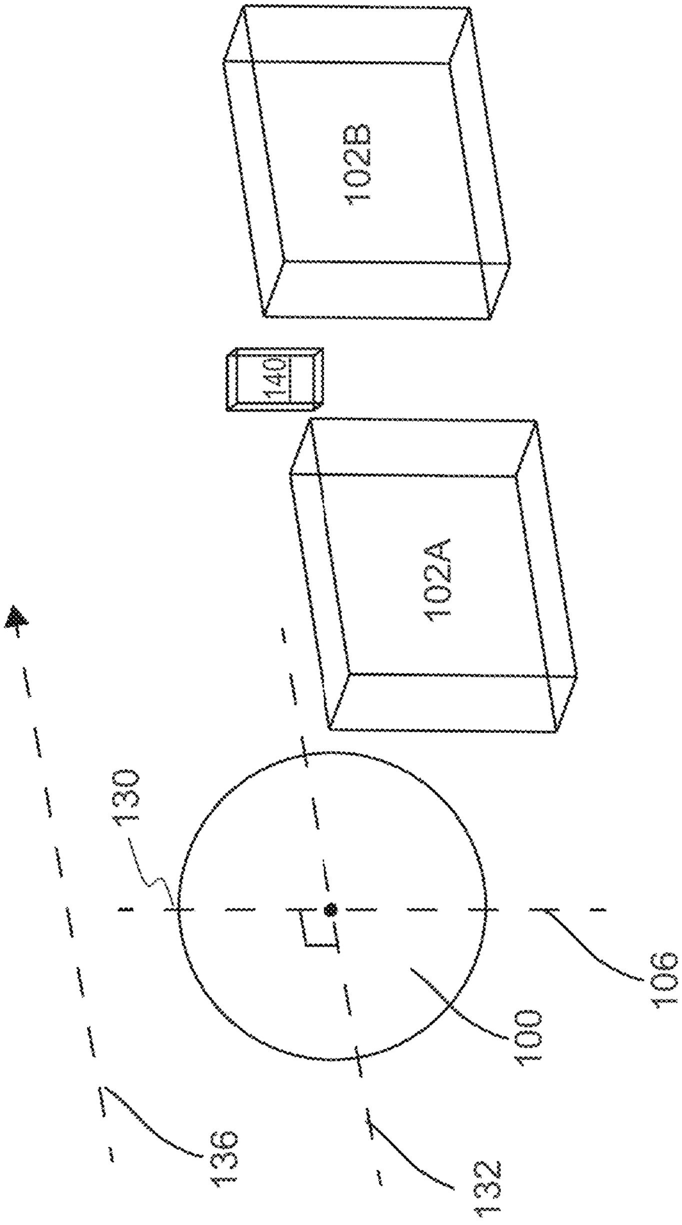
FIG. 11 illustrates a single pass printing layout according to some embodiments.

As shown in FIG. 11, in some embodiments, the first printer head 102A can be located at a rotational printing station, meaning that the golf ball 100 is rotated on axis 106 relative to the first printer head 102A during printing of all or a portion of an image on the golf ball 100. Additionally, a second printer head 102B can be utilized in the manufacturing process to print another portion of the image printed by head 102A or a different image from that printed by head 102A. In some embodiments, the second printer head 102B can be located at a linear printing station where the second printer head 102B is stationary and the golf ball 100 is moved without rotation and linearly, or at least in one direction, past the second printer head 102B during printing.

In some embodiments, the first printer head 102A can be located at a linear printing station and the second printer head 102B can be located at a rotational printing station. In some embodiments, the first printer head 102A and the second printer head 102B can both be located at rotational printing stations. In some embodiments, the first printer head

102A and the second printer head 102B can both be located at linear printing stations. In some embodiments, the printing system can comprise a reorientation mechanism located between the first printer head 102A and the second printer head 102B to rotate the golf ball 100 by about 90 degrees, or between 45 degrees and 135 degrees along second central axis 132 that is perpendicular to rotation axis 106.

In some embodiments, the digital encoder 120 can rotate the golf ball 100 between 45 degrees to 90 degrees about axis 106 between the first printer head 102A and the second printer head 102B in order to print different images on the golf ball 100 at different locations on the ball. In some embodiments, additionally or alternatively, a ball rotation mechanism 140 can rotate the golf ball 100 between 45 degrees to 90 degrees about axis 132 between the first printer head 102A and the second printer head 102B in order to print different images on the golf ball 100 at different locations on the ball. In such embodiments, the ball rotation mechanism 140 can be a mechanical mechanism with an encoder/decoder, a mechanical arm, a friction based contact member, or any other mechanical, electrical, or pneumatic device utilized to rotate the golf ball 100 about axis 132.

As illustrated in FIGS. 10 and 11, the printer heads 102 can be located on the right hand side of the linear direction 136 in some embodiments. However, at any of the printing stations described herein, a printer head 102 can alternatively or additionally be located on the left hand side of linear direction 136, behind the ball, in front of the ball, above the ball, or below the ball.

In some embodiments, the speed at which the ball 100 moves along the linear direction 136 can be 14 inches/sec for a 360 dpi printer resolution. If a 540 dpi printer head is utilized, the speed of the ball movement can range from 10 to 12 inches/sec. In some embodiments, the ratio of the printer resolution divided by the linear direction speed can range from 10 dpi/(inches/sec) to 100 dpi/(inches/sec) or from 20 dip/(inches/sec) to 50 dpi/(inches/sec). In some embodiments, the speed at which balls 100 are printed can range from 20 to 300 balls per minute or from 100 to 250 balls per minute.

In some embodiments, the devices 117 or the curing stations 118 can perform a UV pinning operation and comprise lamps with a power rating of between 0 and 20 watts or between 1.5 watts and 7.5 watts to partially cure the ink applied at a printing station. In some embodiments, the UV curing can be accomplished by mercury arc UV curing lamps or LED curing lamps. In some embodiments, a UV pinning operation can use lamps of a lower wattage than a final UV curing lamp. For example, pinning lamps can have a power rating of 5 W or less while final UV curing lamps can have a power rating of more than 5 W, or from 5 W to 15 W. In some embodiments, photo initiators can be present in the printed ink to narrow the wavelength of light in which curing occurs to reduce ambient light contamination during the curing process. In some embodiments, the energy density of a curing lamp can range from 100 $mJ/cm^2$ to 5000 $mJ/cm^2$, or from 150 $mJ/cm^2$ to 3000 $mJ/cm^2$. In some embodiments, the pinning lamps can have an energy density that is less than the final curing lamps. For example, the pinning lamps can have an energy density ranging from 50 $mJ/cm^2$ to 200 $mJ/cm^2$ while the final UV curing lamps can have an energy density ranging from 1 $J/cm^2$ to 5 $J/cm^2$.

In some embodiments, golf ball 100 can have core and a cover layer surrounding the core. In certain embodiments, golf ball 100 can have a core, at least one mantle layer, and a cover layer. In some embodiments, the golf ball 100 can be a two-piece ball, a three-piece ball, a four-piece ball, a five-piece ball, or a six-piece ball.

The term "core" is intended to mean the elastic center of a golf ball. The core may be a unitary core having a center it may have one or more "core layers" of elastic material, which are usually made of rubbery material such as diene rubbers.

The term "cover layer" is intended to mean the outermost layer of the golf ball; this is the layer that is directly in contact with paint and/or ink on the surface of the golf ball. If the cover consists of two or more layers, only the outermost layer is designated the cover layer, and the remaining layers (excluding the outermost layer) are commonly designated intermediate layers as herein defined. The term "outer cover layer" as used herein is used interchangeably with the term "cover layer."

The term "mantle layer" may be used interchangeably herein with the terms "intermediate layer" and is intended to mean any layer(s) in a golf ball disposed between the core and the outer cover layer. Should a ball have more than one mantle layer, these may be distinguished as "inner intermediate layer" or "inner mantle layer" which terms may be used interchangeably to refer to the intermediate layer nearest the core and furthest from the outer cover, as opposed to the "outer intermediate layer" or "outer mantle layer" which terms may also be used interchangeably to refer to the intermediate layer furthest from the core and closest to the outer cover, and if there are three intermediate layers, these may be distinguished as "inner intermediate layer" or "inner mantle layer" which terms are used interchangeably to refer to the intermediate or mantle layer nearest the core and furthest from the outer cover, as opposed to the "outer intermediate layer" or "outer mantle layer" which terms are also used interchangeably to refer to the intermediate layer further from the core and closer to the outer cover, and as opposed to the "intermediate layer" or "intermediate mantle layer" which terms are also used interchangeably to refer to the intermediate layer between the inner intermediate layer and the outer intermediate layer.

The cover layer can be used with golf balls of any desired size. "The Rules of Golf" by the USGA dictate that the size of a competition golf ball must be at least 1.680 inches in diameter; however, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches to about 1.740 inches is most preferred; however, diameters anywhere in the range of from 1.70 to about 2.0 inches can be used. Oversize golf balls with diameters above about 1.760 inches to as big as 2.75 inches are also within the scope of the invention.

Each of the mantle layers of the golf balls may have a thickness of less than 0.080 inch, more particularly less than 0.065 inch, and most particularly less than 0.055 inch.

In certain embodiments, the inner mantle may have a material Shore D hardness of 15 to 65, particularly 25 to 60, and more particularly 30 to 58. The inner mantle may have a flexural modulus of 2 to 35, particularly 10 to 30, and more particularly 15 to 35, kpsi. The intermediate mantle may have a flexural modulus of 10 to 50, particularly 25 to 50, and most particularly 25 to 40, kpsi, and a material Shore D hardness of 40 to 70, more particularly from 45 to 65, and most particularly from 50 to 60. The outer mantle may have a material Shore D hardness of 55 to 75, particularly 58 to 70, and more particularly 60 to 68. The outer mantle material may have a flexural modulus of 30 to 80, particularly 40 to 80, and most particularly 50 to 75, kpsi. The core and mantle layer(s) may each include one or more of the following polymers.

Such polymers include synthetic and natural rubbers, thermoset polymers such as thermoset polyurethanes and thermoset polyureas, as well as thermoplastic polymers including thermoplastic elastomers such as unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, unimodal ionomers, bimodal ionomers, modified unimodal ionomers, modified bimodal ionomers, thermoplastic polyurethanes, thermoplastic polyureas, polyesters, copolyesters, polyamides, copolyamides, polycarbonates, polyolefins, polyphenylene oxide, polyphenylene sulfide, diallyl phthalate polymer, polyimides, polyvinyl chloride, polyamide-ionomer, polyurethane-ionomer, polyvinyl alcohol, polyarylate, polyacrylate, polyphenylene ether, impact-modified polyphenylene ether, polystyrene, high impact polystyrene, acrylonitrile-butadiene-styrene copolymer styrene-acrylonitrile (SAN), acrylonitrile-styrene-acrylonitrile, styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene terpolymer (EPDM), ethylene-vinyl acetate copolymers (EVA), ethylene-propylene copolymer, ethylene vinyl acetate, polyurea, and polysiloxane and any and all combinations thereof. One example is PARALOID™ EXL 2691A which is a methacrylate-butadiene-styrene (MBS) impact modifier available from Rohm & Haas Co.

Embodiments of the present disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but can be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A single pass printing method for a spherical ball, the method comprising:
- rotating the spherical ball on a first central axis of the ball;
- printing an image on the ball with a plurality of nozzles while the ball is rotating;

wherein:
- the image on the ball is defined by an image area comprising a top boundary line and a bottom boundary line;
- the image area is printed by printing ink droplets correlating to pixels arranged in consecutive image lines, each image line defined by a plurality of the pixels disposed between the top boundary line and the bottom boundary line;
- a center location of each pixel is defined by:
  - a positive angle θ or a negative angle −θ, and
  - a positive linear distance Y from a second central axis of the ball perpendicular to the first central axis or a negative linear distance-Y from the second central axis;
- each pixel comprises one or more ink droplets printed by a respective one of the nozzles;
- a nozzle firing time of each of the plurality of nozzles is based on the center location of the pixel correlating to an ink droplet the nozzle prints; and
- θ, −θ, Y and −Y are defined by the following equations, where R is the radius of the ball measured on the second central axis:

$$\sin(\theta) = \frac{Y}{R}, \text{ and}$$

$$\sin(-\theta) = \frac{-Y}{R}.$$

2. The single pass printing method of claim 1, wherein the nozzle firing time of each of the plurality of nozzles is based on an absolute value of Y or −Y (|Y|) for the pixel correlating to an ink droplet the nozzle prints.

3. The single pass printing method of claim 2, wherein the nozzle firing time for a first nozzle printing an ink droplet correlating to a first pixel located at a higher |Y| is earlier than the nozzle firing time for a second nozzle printing an ink droplet correlating to a second pixel located at a lower |Y|.

4. The single pass printing method of claim 3, wherein the nozzle firing time for the first nozzle is about 1.6 microseconds earlier than the nozzle firing time for the second nozzle.

5. The single pass printing method of claim 2, wherein the nozzle firing time of each of the plurality of nozzles is proportional to the |Y| for the respective pixels in the image line.

6. The single pass printing method of claim 5, wherein, as |Y| decreases, the nozzle firing time increases.

7. The single pass printing method of claim 1, wherein the nozzle firing time of each of the plurality of nozzles is based on an absolute value of 0 or −θ (|θ|) for the pixel correlating to an ink droplet the nozzle prints.

8. The single pass printing method of claim 7, wherein the nozzle firing time for a first nozzle printing an ink droplet correlating to a first pixel located at a higher |θ| is earlier than the nozzle firing time for a second nozzle printing an ink droplet correlating to a second pixel located at a lower |θ|.

9. The single pass printing method of claim 8, wherein the nozzle firing time for the first nozzle is about 1.6 microseconds earlier than the nozzle firing time for the second nozzle.

10. The single pass printing method of claim 7, wherein the nozzle firing time of each of the plurality of nozzles is proportional to |θ| for the respective pixels in the image line.

11. The single pass printing method of claim 10, wherein, as |θ| decreases, the nozzle firing time increases.

12. The single pass printing method of claim 1, wherein the image area comprises a continuous image band wrapped around all or a portion of the ball and having a constant height.

13. The single pass printing method of claim 12, wherein the continuous image band is printed by printing ink droplets correlating to pixels in consecutive image lines having a different number of pixels.

14. The single pass printing method of claim 12, wherein the continuous image band wraps completely around the ball.

15. The single pass printing method of claim 12, wherein the continuous image band wraps around the ball such that a first portion of the image band overlaps a second portion of the image band.

16. The single pass printing method of claim 15, wherein the image lines correlating to the first portion of the image band and the second portion of the image band are printed with a smaller volume of ink compared to the image lines correlating to the remainder of the image band.

17. The single pass printing method of claim 1, wherein the ball is rotating at a rate of about 160 revolutions per minute.

18. The single pass printing method of claim 1, wherein the plurality of nozzles prints at a resolution of at least 360 dpi.

19. The single pass printing method of claim 1, wherein a volume of the ink droplets printed by the plurality of nozzles varies based on an absolute value of Y or −Y (|Y|) for the pixels correlating to the ink droplets the nozzles print.

20. The single pass printing method of claim 1, wherein the dpi of ink droplets printed by the plurality of nozzles varies based on an absolute value of Y or −Y (|Y|) for the pixels correlating to the ink droplets the nozzles print.

21. The single pass printing method of claim 1, wherein the plurality of nozzles are configured to print the image on an upper hemisphere and a lower hemisphere of the spherical ball in a single pass.

* * * * *